Figure 2:
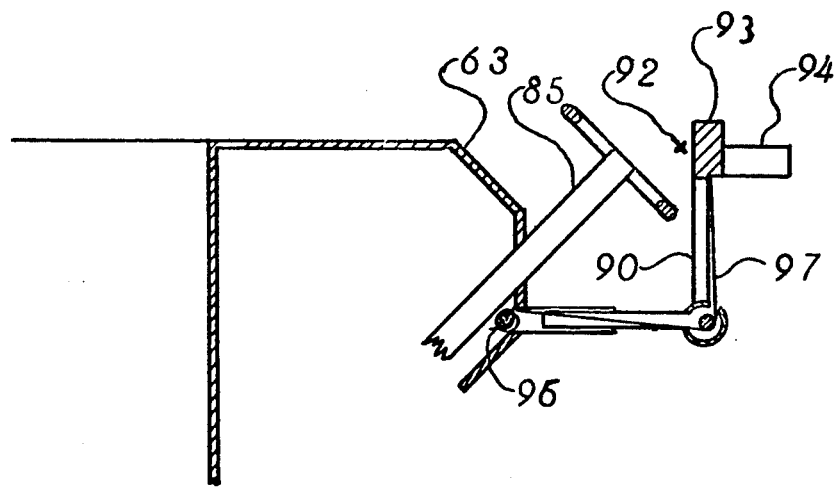

United States Patent [19]

Appley

[11] 4,206,936
[45] Jun. 10, 1980

[54] VEHICLE RESTRAINT SYSTEM FOR THE HANDICAPPED

[76] Inventor: Robert J. Appley, 902 Birch Ave., Shelby, Mont. 59474

[21] Appl. No.: 931,615

[22] Filed: Aug. 7, 1978

Related U.S. Application Data

[62] Division of Ser. No. 794,822, May 9, 1977.

[51] Int. Cl.² .............................................. B60R 27/00
[52] U.S. Cl. .................................................... 280/751
[58] Field of Search ............... 280/748, 751, 753, 750; 297/390

[56] References Cited

U.S. PATENT DOCUMENTS

| | | | |
|---|---|---|---|
| 2,746,767 | 5/1956 | Evans | 280/748 |
| 2,923,559 | 2/1960 | Owens | 280/748 |
| 3,834,728 | 9/1974 | Anderson | 280/753 |
| 3,883,329 | 6/1975 | Monaghan | 280/753 |
| 4,023,643 | 5/1977 | Bagley, Jr. | 280/753 |

*Primary Examiner*—Robert R. Song
*Attorney, Agent, or Firm*—Arthur L. Urban

[57] ABSTRACT

A vehicle having a dash mounted driver restraint system including a padded horizontal lap-engaging portion, adjustable connecting member joining the lap-engaging portion with the dash, an upstanding arm pivotally connected to the lap-engaging portion, a padded body-contacting portion on the free end of the arm, an inertia reel adjacent the dash, and flexible connecting member operatively connecting the free end of the arm with the inertia reel.

4 Claims, 2 Drawing Figures

VEHICLE RESTRAINT SYSTEM FOR THE HANDICAPPED

This is a division of application Ser. No. 794,822 filed May 9, 1977.

This invention relates to a vehicle capable of being operated by a physically handicapped person and more particularly relates to a vehicle providing independent transportation capability for a wheel chair bound individual.

A major effort is underway in the United States to reduce the logistic problems of physically handicapped persons. For example, new buildings are being built with wider doors and ramps to accommodate wheel chairs, and existing buildings are remodeled to provide such facilities. Buses are now being offered with lifts for wheel chairs. Also, cities are replacing curbs at intersections with ramps to simplify movement of wheel chairs from the street to the sidewalk.

However, one area in which little has been done is that of vehicles for physically handicapped individuals. The handicapped have had to arrange personally for the modification of conventional vehicles to enable them to drive. These modifications usually are makeshift in nature and often marginally acceptable. For example, a lift may be added on the side or back of a van, but such lifts are not convenient to operate and occupy considerable space. Also, hand operated extensions can be added to the brake and throttle pedals to permit operation of a vehicle without the use of the feet. These extensions often are cumbersome to operate and require considerable dexterity.

A further problem is the safety of a wheel chair bound driver within the vehicle in the event of an accident. It has been proposed to use safety belts and harnesses on the wheel chair and the occupant, but this is not acceptable since wheel chairs are not designed to take the forces imposed by the forward movement of a human body in case of a front end collision. The use of belts and harnesses around the chair and driver also is not desirable since in a rollover the weight of the chair may be added to the driver's weight that is bearing against the belts, thereby making release of the belts practically impossible. Another objection to the use of belts is the difficulties some physically handicapped persons have in manipulating and latching such devices.

Thus, it is apparent that simple solutions to the problems of entry and exit, driver operating controls and occupant safety are not available to wheel chair bound drivers who desire independent transportation capability.

The novel vehicle of the present invention provides a driver restraint system which affords a high degree of protection in case of accident without the use of belts and/or harnesses. Also, the restraint system is adjustable for different drivers and does not inhibit required movement by the driver during normal operation of the vehicle.

Figure 1:
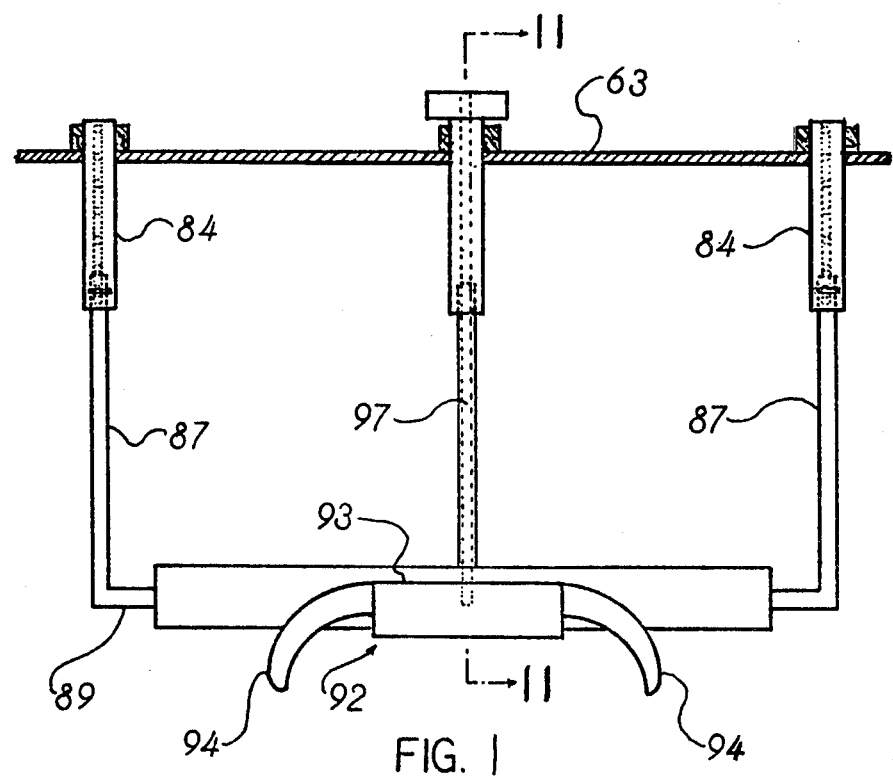

Other benefits and advantages of the present invention will be apparent from the following description and the accompanying drawings in which:

FIG. 1 is a top view of a novel driver restraint system of the vehicle of the invention; and FIG. 2 is a sectional view taken along line 11—11 of FIG. 1.

FIGS. 1 and 2 illustrate a driver restraint system of the vehicle of the invention. As shown, tubular supports 84 are affixed to the dash 63 of the vehicle and extend outwardly below steering wheel 85. Within tubular supports 84 are disposed slides 87 which may be of the seat track type to provide adjustment and locking of the desired position. The free ends of the slides 87 are joined by a padded rod 89. An arm 90 is pivotally connected to rod 89 midway between slides 87. To the free end of arm 90 is pivotally attached a padded body-contacting member 92 with a center portion 93 and curved arms 94 extending therefrom. An inertia reel 96 is mounted on the dash 63 between the tubular supports 84. A strap 97, preferably of nylon, extends from reel 96 around rod 89, along arm 90 and connected thereto adjacent the body-contacting member 92. Inertia reel 96 and strap 97 are of the type commonly used for seat belts and belt retractors.

A driver upon entering the vehicle positions his wheel chair behind the steering wheel 85 and locks the chair wheels. Then the driver moves the padded rod 89 snugly against his lap by adjusting slides 87 partway out of tubular supports 84. Padded body-contacting member 92 bears against the driver's chest and the curved arms 94 contact the sides of his body. The inertia reel 96 allows arm 90 to pivot forward when the driver leans forward in normal driving movements. However, if the driver's body should be thrown forward against the padded body-contacting member 92 in a collision, the reel 96 will lock thereby restraining the driver's body from striking the steering wheel and dash.

The vehicle of the invention also provides a novel driver restraint system which protects a driver against injury in case of an accident. The restraint system of the invention is adjustable to fit the driver and permits normal driver movement as required. The restraint system accomplishes these objectives without the need for belts and/or harnesses which may present problems for the physically handicapped.

It will be apparent that various modifications may be made in the novel vehicle and the door assembly, operating controls and restraint system thereof described in detail above and shown in the drawings. For example, the upper glass section of the door assembly may be replaced with a metal or plastic section. Also, the control lever may be of a different configuration to permit use by a person with a particular hand and/or arm handicap. Further, the padded chest portion of the driver restraint system may be a different design to accommodate individuals with special physical problems. Therefore, the invention is to be limited only by the following claims.

What is claimed is:

1. A dash mounted driver restraint system for a vehicle including a padded horizontal lap-engaging portion, adjustable means joining said lap-engaging portion with said dash, an upstanding arm pivotally connected to said lap-engaging portion, a padded body-contacting portion on the free end of said arm, an inertia reel adjacent said dash, and flexible connecting means operatively connecting said free end of said arm with said inertia reel.

2. A dash mounted driver restraint system according to claim 1 wherein said adjustable means includes latchable track means.

3. A dash mounted driver restraint system according to claim 1 wherein said body-contacting portion includes padded curved lateral extensions.

4. A dash mounted driver restraint system according to claim 1 wherein said flexible connecting means comprises a nylon strap.

* * * * *